US008924375B1

(12) United States Patent
Bilsborough

(10) Patent No.: US 8,924,375 B1
(45) Date of Patent: Dec. 30, 2014

(54) ITEM ATTENTION TRACKING SYSTEM AND METHOD

(75) Inventor: Michael Terrence Bilsborough, Berkshire (GB)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/484,896

(22) Filed: May 31, 2012

(51) Int. Cl.
*G06F 17/00* (2006.01)

(52) U.S. Cl.
USPC .......................................................... 707/723

(58) Field of Classification Search
None
See application file for complete search history.

(56) References Cited

U.S. PATENT DOCUMENTS

| 7,593,995 | B1 | 9/2009 | He et al. | |
|---|---|---|---|---|
| 8,090,705 | B1 | 1/2012 | Panse | |
| 8,326,964 | B1* | 12/2012 | Chourey et al. | 709/223 |
| 2005/0183143 | A1* | 8/2005 | Anderholm et al. | 726/22 |
| 2007/0255754 | A1* | 11/2007 | Gheel | 707/104.1 |
| 2008/0201205 | A1* | 8/2008 | Rose et al. | 705/10 |
| 2008/0276179 | A1* | 11/2008 | Borenstein et al. | 715/736 |
| 2010/0125911 | A1* | 5/2010 | Bhaskaran | 726/23 |
| 2012/0016874 | A1* | 1/2012 | Dean et al. | 707/727 |
| 2012/0203584 | A1* | 8/2012 | Mishor et al. | 705/7.11 |

OTHER PUBLICATIONS

Symantec Corporation, "Clearwell eDiscovery Platform™—Data Sheet: Archiving and eDiscovery," 2011, 7 pages.
Symantec Corporation, "Symantec Archiving and eDiscovery—Solution Overview: Archiving and eDiscovery," 2011, 4 pages.
Symantec Corporation, "Symantec Enterprise Vault™ Discovery Accelerator—Data Sheet: Archiving and eDiscovery," 2011, 4 pages.

* cited by examiner

*Primary Examiner* — Robert Beausoliel, Jr.
*Assistant Examiner* — Hau H Hoang
(74) *Attorney, Agent, or Firm* — Wilmer Cutler Pickering Hale and Dorr LLP

(57) ABSTRACT

User activity performed on an electronic data item is detected on a computing system. A record of the user activity is stored in an activity log that may be associated with the item, or in a separate file or system. The user activity is later scored, the score being based on one or more factors, including the user activity performed, characteristics of the electronic data item, and the user who performed the action. Optionally, activity logs from various computing systems may be combined into a master activity log. A request for a search is received, a search is performed, and ranked results of the search are presented to the requestor. Optionally, scores for a given user activity and electronic data item are combined with other scores, based on the activities being common, the item being common to the one or more activities, or other factors, according to user configuration.

18 Claims, 4 Drawing Sheets

| Date | Information Type | User Activity | Item Code | User |
|---|---|---|---|---|
| 1/9/2010 | email | review 50% | 1290213 | Devans |
| 1/9/2010 | docfile | open for 2 hours | 1290404 | FSmith |
| 1/9/2010 | PDF file | Delete unread | 1440263 | Devans |
| 1/9/2010 | WBrowser | keyword search | 129066 | Devans |
| 1/12/2010 | email | Print | 1290213 | Devans |

•
•
•
•

Activity Logfile 300

FIG. 3

ITEM ATTENTION TRACKING SYSTEM AND METHOD

BACKGROUND

1. Field of the Invention

The present invention relates to computing system operations. More particularly, the present invention relates to computing system operations performed on electronic data.

2. Description of the Related Art

The use of electronic data in business and personal activities has become nearly ubiquitous. Users of computing systems operate on a vast amount of different kinds of data in nearly all computing system-related activities such as creating and reviewing documents, and communicating with other users of other computing systems.

In some situations, such as when searching for data relating to a legal matter, it may be necessary to search for data that potentially exists on one, a few, or perhaps many different computing systems. After having performed a search of those computing systems, results data matching search parameters may be presented to a requestor.

Often, the data presented as a result of a search is quite voluminous, perhaps including many thousands, or even millions of data items, and thus takes a great deal of time to process, to locate data that the requestor seeks. Further, each data item is often treated alike, and thus there is no differentiating factors indicating that one data item is more or less important than any other data item.

SUMMARY

In accordance with one embodiment, user activity performed on an item is detected on a computing system. A record of the user activity is stored in an activity log that may be associated with the item, or in a separate file or system. In one embodiment, a score is associated with the data item and the user activity performed, the score being based on one or more factors.

Optionally, activity logs from various computing systems may be combined into a master activity log. A request for a search is received, the request including one or more parameters such as an activity score, after which a search is performed on an activity log or a master activity log, and search results are presented to the requestor. Optionally, the search results are ranked according to score. Optionally, one or more scores for a given user activity and item may be combined with other scores for other activities, resulting, for example in an overall item score.

Embodiments are best understood by reference to the following detailed description when read in conjunction with the accompanying drawings.

BRIEF DESCRIPTION OF THE DRAWINGS

FIG. 3 is an exemplary activity log, in accordance with one embodiment.

Common reference numerals are used throughout the drawings and detailed description to indicate like elements.

DETAILED DESCRIPTION

Figure 1:
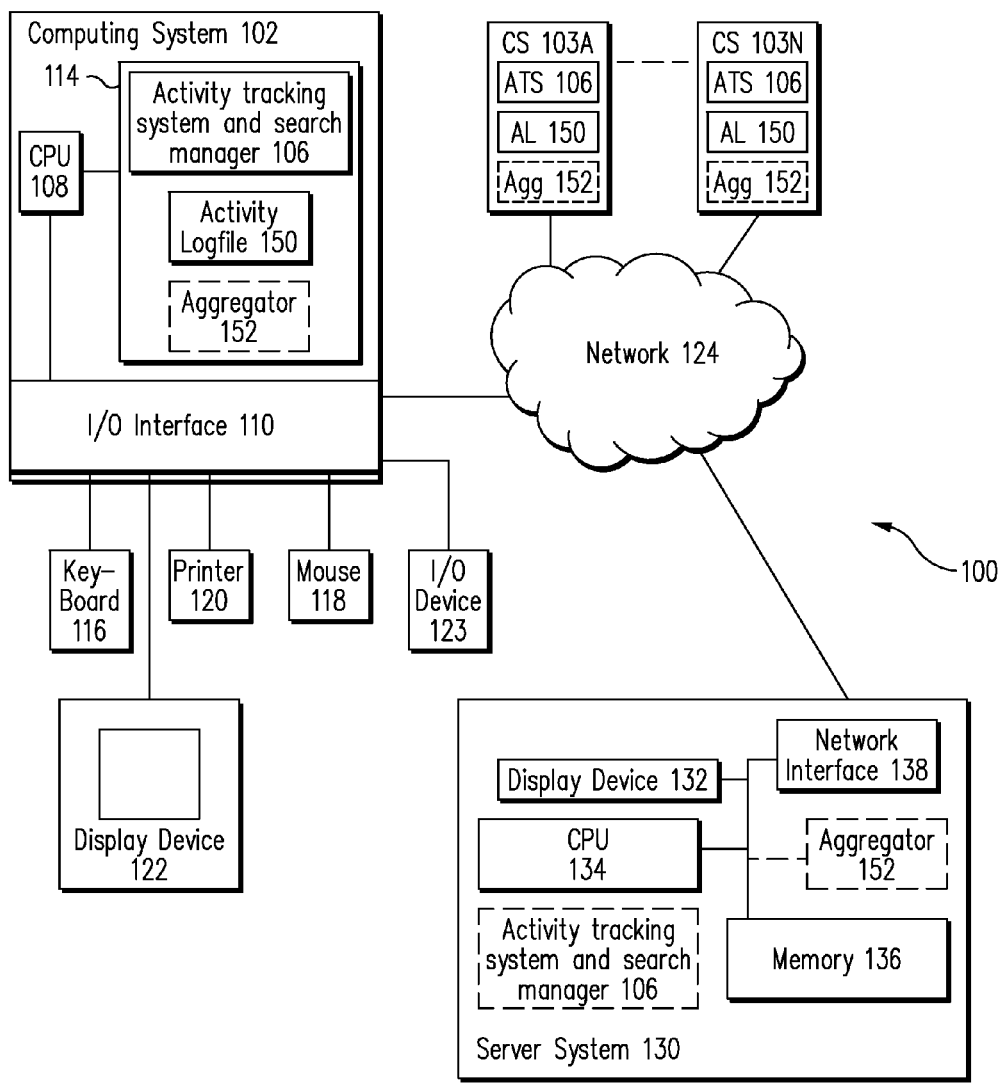
FIG. 1 is a diagram of a client-server system that includes an activity tracking system and search manager application executing on a computing system in accordance with one embodiment.
Figure 2A:
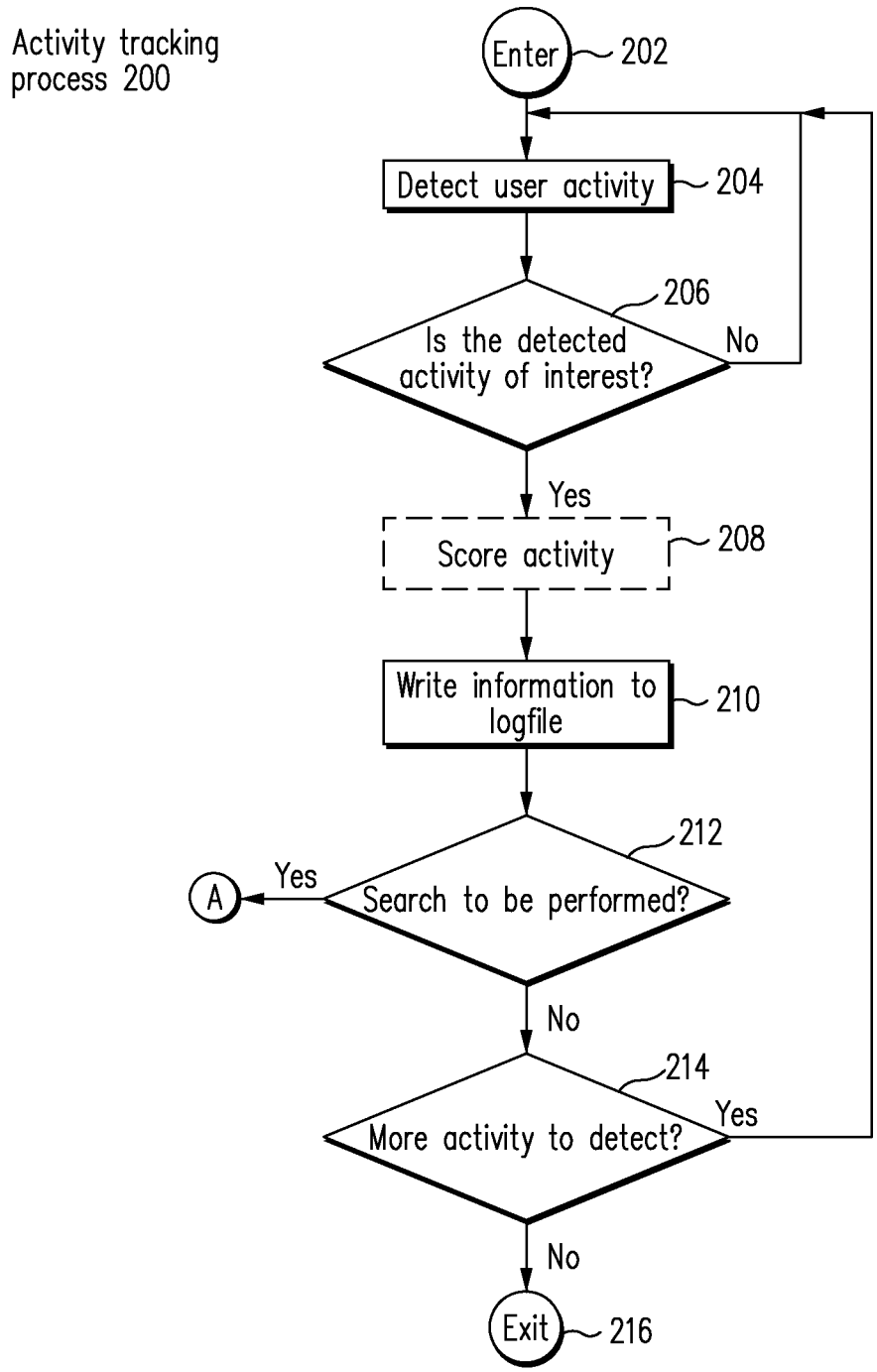
FIGS. 2A and 2B are a flow diagram of an activity tracking process 200 in accordance with one embodiment.
Figure 2B:
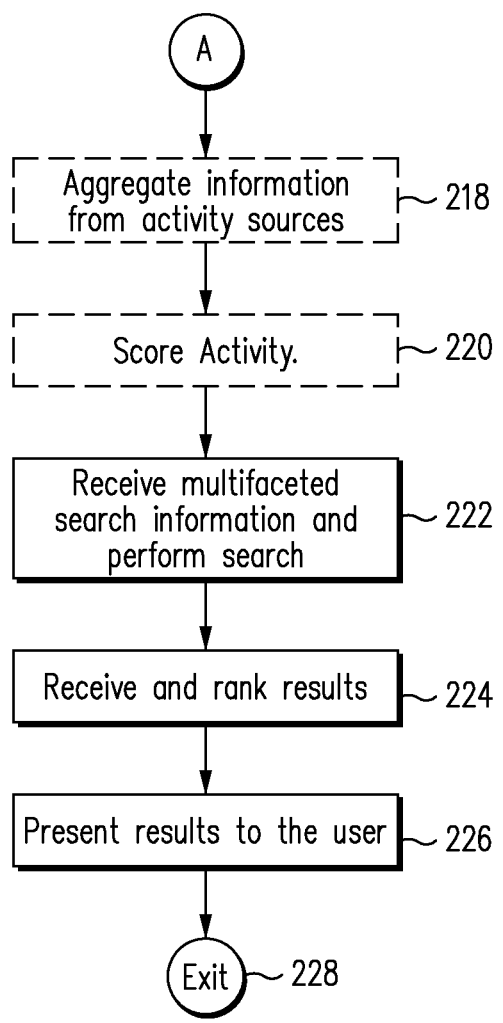

As an overview, in accordance with one embodiment, referring to FIGS. 1, 2A and 2B, user activity is detected on computing system 102 in a DETECT USER ACTIVITY OPERATION 204. Flow proceeds to an IS THE DETECTED ACTIVITY OF INTEREST CHECK OPERATION 206, where a determination is made as to whether the particular user activity is a user activity that is of interest. If the detected user activity is of interest, flow proceeds optionally to a SCORE ACTIVITY OPERATION 208 when a score is assigned to the item and user activity, based on the performed user activity. The user activity and optional score are logged at a WRITE INFORMATION TO LOGFILE OPERATION 210. Other information may also be logged, such as an item identifier, a hash equivalent of the item, and the like.

At a SEARCH TO BE PERFORMED CHECK OPERATION 212, a determination is made as to whether a user desires to search information contained within one or more activity logs. If there is no current desire to search information contained within one or more activity logs, a determination is made at a MORE ACTIVITY TO DETECT CHECK OPERATION 214 as to whether there is more user activity to detect and log. If so, flow proceeds again to DETECT USER ACTIVITY OPERATION 204. If there is no further user activity to detect, the process ends at an EXIT OPERATION 216.

If, at SEARCH TO BE PERFORMED OPERATION 212, a search is to be performed, logged data from other computing systems is optionally aggregated at an AGGREGATE INFORMATION FROM ACTIVITY SOURCES OPERATION 218. If optional SCORE ACTIVITY OPERATION 208 was not previously performed, a SCORE ACTIVITY OPERATION 220 may be performed on the aggregated information. Alternatively, even if optional SCORE ACTIVITY OPERATION 208 was previously performed, SCORE ACTIVITY OPERATION 220 may again be performed on the aggregated information, for example, to update the previously assigned scores to reflect new scores based on new score criteria, or for other reasons.

At a RECEIVE MULTIFACETED SEARCH INFORMATION AND PERFORM SEARCH OPERATION 222, search parameters are received from a user, and a search of the aggregated information is performed with the intent of receiving search results that include or match the search parameters. At a RECEIVE AND RANK RESULTS OPERATION 224, the search results are received, and items of information within those search results are then ranked according to previously determined criteria. At a PRESENT RESULTS TO THE USER OPERATION 226, the ranked search results are presented to the user.

Now, in more detail, FIG. 1 is a diagram of a client-server system 100 that includes an Activity Tracking System and Search Manager Application 106 executing on a computing system 102, e.g., a first computing system, in accordance with one embodiment. Computing system 102 further includes an activity logfile 150 which, in one embodiment, is a standalone file, or which, in one embodiment, is instead a set of independent logfiles. In one embodiment, activity logfile 150 is presented as a standalone file, and includes information such as an electronic data item identifier referencing an electronic data item, a user activity identifier referencing a user activity performed on or with the electronic data item, and an optional score.

In one embodiment, various individual activity logfiles 150 are presented as metadata saved with respective electronic data items, as discussed below. An aggregator 152 is optionally presented as part of computing system 102, and can also or instead be a component of a computing system 103A or any other computing system 103N. Aggregator 152 thus can be present on one computing system such as computing system 102, or may be a component of all computing systems such as computing systems 102, computing systems (CS) 103A, ..., 103N, or can alternatively be a component of any subset of computing systems, wherever aggregation activities are intended to take place.

Computing system 102, sometimes called a client or user device, typically includes a central processing unit (CPU) 108, hereinafter CPU 108, an input output (I/O) interface 110, and a memory 114. As is known by those of skill in the art, among other functions of a CPU such as CPU 108, CPU 108 executes applications stored in memory 114, such as Activity Tracking System and Search Manager Application 106.

Computing system 102 may be a desktop computing system, a handheld wireless computing system such as a smartphone, or may be any other type of computing device.

Computing system 102 may further include standard devices like a keyboard 116, a mouse 118, a printer 120, and a display device 122, as well as, one or more standard input/output (I/O) devices 123, such as a compact disk (CD) or DVD drive, floppy disk drive, or other digital or waveform port for inputting data to and outputting data from computing system 102. In one embodiment, Activity Tracking System and Search Manager Application 106 is loaded into computing system 102 via I/O device 123, such as from a CD, DVD or floppy disk containing Activity Tracking System and Search Manager Application 106. Alternatively, activity Tracking System and Search Manager Application 106 is loaded into computing system 102 via network 124.

Computing system 102 is coupled to a server system 130 of client-server system 100 through network 124, a wired and/or wireless network known to those of skill in the art.

Also coupled to network 124 are a plurality of computing systems (CS) 103A, ..., 103N, collectively computing systems 103. computing systems 103 are similar to computing system 102 and each include one or more of an Activity Tracking System and Search Manager Application 106 (ATS 106), an activity logfile 150 (AL 150), and optionally an aggregator 152 (Agg 152), as needed. In one embodiment, computing systems 103 represent computing systems operated by users other than a user of computing system 102, for example, users at the same company, users that are part of the same work or study group at a school, the public at large, or any other collection of users. However, in one embodiment, an individual user may be associated with, operate, or control more than one computing system.

In one embodiment, computing Systems 103, and server system 130 are similar to computing system 102, for example, and thus also include a central processing unit, an input output (I/O) interface, and a memory. Different ones of the CPUs may be coupled to the same or different memories, and may execute one or more different operations described herein. Thus, computing processor executable instructions representing the different operations discussed herein may be distributed among different memories, and executed accordingly by different CPUs.

CPU 108 may perform, as one example, DETECT USER ACTIVITY OPERATION 204, and another CPU, such as a CPU associated with any of computing Systems 103 and 103N, and server system 130 may perform, for example IS THE DETECTED ACTIVITY OF INTEREST OPERATION 206, and perhaps perform additional operations as well.

Computing Systems 103 and server system 130 may or may not further include standard devices like a keyboard, a mouse, a printer, a display device and an I/O device(s). The various hardware components of computing systems 103 and 103N, and server system 130 are not illustrated to avoid detracting from the principles of this embodiment.

Network 124 can be any network or network system that is of interest to a user. In various embodiments, network interface 138 and I/O interface 110 include analog modems, digital modems, a network interface card or any other network interface known to those of skill in the art.

Computing system 102 includes an activity logfile 150 stored in memory 114. Activity logfile 150 is a primary storage location for user activity-related information.

FIGS. 2A and 2B are a flow diagram of an activity tracking process 200 in accordance with one embodiment. Referring now to FIGS. 1, 2A and 2B together, execution of Activity Tracking System and Search Manager Application 106 (ATS 106) by one or more Cpus, such as by CPU 108, results in the operations of activity tracking process 200 as described below.

From an ENTER OPERATION 202, flow moves to aDETECT USER ACTIVITY OPERATION 204 where user activity is detected on a computing system such as computing system 102. Such user activities include, but are not limited to, for example, a user logging into the computing system 102, a user opening an electronic data item such as a document or an electronic mail message, and/or printing the document, a user scrolling through a document, a user closing a document, a user sending, printing, or receiving an electronic message or electronic mail. Other detectable user activities are known to those of ordinary skill.

Although reference is made to an electronic data item, it is intended that electronic data item refer to any electronic information that an activity may be performed with or on. For example, the act of a user opening an application involves the application, possibly application data, application configuration files, and the like. Thus, it is intended that electronic data item refer to any relevant electronic information, executable or not, within a computing system that is directly related to an activity a user performs. System configuration parameters determined by an administrator or user, and system design will determine the focus of a given embodiment, while remaining within the scope of this disclosure.

From DETECT USER ACTIVITY OPERATION 204, flow proceeds to an IS THE DETECTED ACTIVITY OF INTEREST CHECK OPERATION 206, where a determination is made as to whether the particular user activity is a user activity that is of interest, and thus whether that user activity should be logged. It is contemplated that some activities, such as a user logging into a computing system, will not be of interest to some administrators of Activity Tracking System and Search Manager Application 106, while other activities may be of interest. Further, some administrators may want to focus on a particular group of user activities and electronic data items, while other administrators may wish to focus on a different group of user activities and electronic data items.

In one embodiment, a list of activities is presented to a user or administrator of Activity Tracking System and Search Manager Application 106, and the user or administrator configures Activity Tracking System and Search Manager Application 106 to track some user activities and not others. In one embodiment, one or more default configurations are provided for use in different situations.

For example, in a situation where user activities are being tracked to determine how much time company employees spend creating, sending, receiving or reading electronic mail, a configuration file indicating that electronic mail-related activities are of interest may be employed, while other user activities are deemed not to be of interest.

In a different situation, electronic mail-related user activities may be deemed to not be of interest, but user activities relating to use of a web browser and the internet may be deemed to be of interest. In this second example, a configuration file may be presented where electronic mail-related user activities are deemed to not be of interest, while web browser-related user activities are deemed to be of interest. Other configurations may include, for example, deeming all activities to be of interest. Other combinations are possible, and are well within the scope of this disclosure.

In some situations, it may be desirable to track different activities for different users. In this embodiment, user configuration information identifying different activities of interest for different specified users may also be configured by a user or administrator, if desired.

If at IS THE DETECTED ACTIVITY OF INTEREST CHECK OPERATION 206, the detected user activity is found to be of interest, flow proceeds optionally to a SCORE ACTIVITY OPERATION 208 at which time a score is assigned to the item and user activity, based on one or more criteria. In one embodiment, scores, and other information are contained in a score template which provides scores that may be assigned based on various activities that are performed on various electronic data items having various characteristics.

In one embodiment, a default score template is used when scoring items and activities. In one embodiment, a score template is received from an external computing system such as server system 130, with the newly received score template replacing any previously used score template. Further, in one embodiment, following receipt of a new score template from an external source, previously scored activities are rescored as if they had not previously been scored. Thus, the information and score criteria used in the newly received score template is employed when scoring the previously logged user activity information.

In one embodiment, a score may be assigned based solely on the user activity that was performed. Depending on the user activity, the score to be assigned may be increased or decreased based on a length of time over which the user activity was performed. In one embodiment, a "normal" period of time is predetermined, and is not based on the length of the document. In one embodiment, if a document was open for reading, editing, or for another reason, the score assigned to the particular user activity is increased based on the document being open for longer than a normal period of time, where the normal period of time is determined partly based on the length of the document. In one embodiment, if a document was open for reading, editing, or for another reason, the score assigned to the particular user activity is decreased based on the document being open for shorter than a normal period of time.

In one embodiment, receiving an email with an attachment is a user activity of interest, and the scoring of that user activity includes consideration of whether the attachment within the received email was opened and read by the user, and how much of that attachment was read, based on how far down the user scrolled within the received attachment.

Other activities which may or may not be of interest include receiving electronic mail having an embedded hyperlink, and whether the hyperlink was clicked on, resulting on a browser opening or other user activity occurring relating to displaying information at the hyperlinked web site. Whether or not the hyperlink was clicked on or otherwise activated for viewing by the user may affect the score.

In one embodiment, an assigned score may be increased or decreased based on how much of the document was affected by the user activity. For example, if the user activity involves scrolling through a document, reading a document, or any other activity involving reviewing or reading a document, the respective assigned score may be increased by a first factor if more than 50% of the document was displayed, indicating that the user likely read at least 50% of the document, for example, and may be increased by a second factor if more than 75% of the document had been displayed (indicating that the user likely read at least 75% of the document, for example). The factor may be multiplicative or additive. Thus, if the "normal" score for reading a document is 20, and a factor associated with involving at least 50% of the document is 10 and is additive, then a user reading at least 50% of a document would result in a score of 20+10, or a total of 30.

Alternatively, if the factor is 30% and is multiplicative, using the same example above, the result is a score of 20+(20*0.3)=26.

In one embodiment, an assigned score may be increased or decreased based on one or more characteristics of the electronic data item. Such characteristics include, but are not limited to the importance of the electronic data item as determined by a user, an importance of an electronic data item as determined by a sender of that electronic data item, the subject line of an electronic mail being in upper case, the number of recipients of an electronic mail being above or below a threshold, and the identity or position of a sender within a company, for example. Other characteristics may also trigger a higher or lower score while remaining within the scope of this disclosure.

In one example where an assigned score is increased or decreased based on an importance level attributed to the electronic data item, if the user activity involves reading an electronic mail message marked as high importance by a sender to a user, the assigned score is increased by a multiplicative or additive factor. In another example, if the user activity involves reading an electronic mail message marked as low importance by a sender to a user, the assigned score may be decreased by a multiplicative or additive factor.

Following optional SCORE ACTIVITY OPERATION 208, or following IS THE DETECTED ACTIVITY OF INTEREST CHECK OPERATION 206 if SCORE ACTIVITY OPERATION 208 was not performed, the user activity and optional score are logged at a WRITE INFORMATION TO LOGFILE OPERATION 210. In WRITE INFORMATION TO LOGFILE OPERATION 210, any information desired to be analyzed later is logged and stored within activity logfile 150. Such logged information may include, but is not limited to a user identifier identifying a user that is believed to have performed the user activity, based on login information, or from other information. Other logged information may include, in one embodiment, an item identifier, a hash equivalent of the item or a representative portion of the item, a time period over which the user activity was performed, a time and date, a beginning and ending time and date when the user activity was performed, and the like.

Different information to be logged, and whether the activity logfile 150 is standalone or is instead metadata to be stored with the respective electronic data item may also be configurable by a user or administrator. If activity logfile 150 is standalone, it may include an item identifier, for example. However, if activity logfile 150 is stored as metadata associated directly with the electronic data item, an item identifier is not required to be stored in activity logfile 150 since activity logfile 150, in this embodiment, is already directly associated with and stored with the electronic data item itself.

Following the storage of information in activity logfile 150 at WRITE INFORMATION TO LOGFILE OPERATION 210, flow proceeds to a SEARCH TO BE PERFORMED CHECK OPERATION 212 where a determination is made as to whether a user desires to search the previously logged information. If, at SEARCH TO BE PERFORMED CHECK OPERATION 212, there is no current desire to search the logged information, a determination is made at a MORE ACTIVITY TO DETECT OPERATION 214 as to whether there is more user activity to detect and log. If so, flow proceeds from MORE ACTIVITY TO DETECT OPERATION 214 to a DETECT USER ACTIVITY OPERATION 204. If there is no further user activity to detect, the process ends at an EXIT OPERATION 216.

If, at SEARCH TO BE PERFORMED OPERATION 212, a search is to be performed, logged data from other computing systems is optionally aggregated at AGGREGATE INFORMATION FROM ACTIVITY SOURCES OPERATION 218.

Aggregating information essentially involves collecting information contained in the various activity logfile 150 of the various computing systems, such as computing systems 102 and 103. Optionally, once the information is collected from the various computing systems, the information may be further integrated by combining the various individual logs into a single master aggregated log which includes the information collected from each of the individual activity logfile 150.

Recall that if the activity logfile 150 of the various computing systems are metadata associated with individual electronic data files, that there is no reason to include an item identifier, or to otherwise identify items within activity logfile 150, since the activity logfile 150, in that scenario, is directly stored as metadata with the electronic data item. Thus, in this instance, when data is aggregated from these systems, item identifiers, hash equivalents of the electronic data items themselves, or some other electronic data item information is added to the aggregated data, during the aggregation operation. Optionally, user information identifying a primary user of the respective computing systems may also be added to activity logs 150, if desired.

In one embodiment, item identifiers are added to the data contained in the various individual activity logs as data is aggregated locally on each individual computing system, prior to transmitting the locally aggregated data to an external computing system. Once that locally aggregated data is transmitted to the external computing system, the data may either be further combined with locally aggregated data from other computing systems, or kept separately, depending on how the system operation is configured by the administrators and/or users.

In one embodiment, once activity logs 150 are collected from the various individual computing system, the individual activity logs 150 are combined into a master activity log. FIG. 3 is an exemplary activity log, in accordance with one embodiment. In one embodiment, activity logfile 300 includes a date a user activity took place, an information type relating to the electronic data item the activity was performed on, information relating to the user activity itself, an item code or item identifier representing the electronic data item the activity was performed with, and user information sufficient to identify a user who performed the activity.

In one embodiment, similar or identical activities performed by different users are combined by adding the various scores relating to those individual activities together and presenting the combined information as one line item entry in the master activity log. Thus, if a user activity "open document X" was performed on three different computing systems, and the scores relating to those activities were 10, 14, and 19 (varying due to factors that may have previously been applied), the combined score is 43, for the new combined single entry in the master activity log.

In one embodiment, combining information by user may be most appropriate. Thus, in one embodiment, scores relating to all activities performed by the same user (even over different computing systems) may be combined, to identify users who have larger amounts of user activity. Thus, a user that performed 4 activities, two of which are identical, may have, for example, scores of 12, 51, 32, and 9, for a user total of 104.

If optional SCORE ACTIVITY OPERATION 208 was not previously performed, SCORE ACTIVITY OPERATION 220 may be performed on the aggregated information. Alternatively, even if optional SCORE ACTIVITY OPERATION 208 was previously performed, SCORE ACTIVITY OPERATION 220 may again be performed on the aggregated information, for example, to update the previously determined scores to reflect new scores, based on new score criteria contained in a new score template configured on the computing system employed for the aggregation operation, for example, or for other reasons. The performance of SCORE ACTIVITY OPERATION 220 is accomplished in the same way as was previously described with respect to optional SCORE ACTIVITY OPERATION 208.

At RECEIVE MULTIFACETED SEARCH INFORMATION AND PERFORM SEARCH OPERATION 222, search parameters are received from a user, and a search of the aggregated information is performed with the intent of receiving results that include or match the search parameters. In one embodiment, the search parameters include a score parameter which either includes certain information of the aggregated information from the search results, or excludes certain information of the aggregated information from the search results, based on the score associated with one or more electronic data items.

At RECEIVE AND RANK RESULTS OPERATION 224, the results of the search are received, and are then ranked according to previously determined ranking criteria. In one embodiment, the ranking criteria comprises ranking based on the score attributed to each item.

If, when logging user activity information in activity logs 150, dates and times were recorded, reports may be generated as to scores for particular users over a user or administrator defined time period, for example. Alternatively, if the data is combined by user activity as discussed above, reports may be obtained by user activity over a user or administrator defined time period. Data and time periods may be supplied as defaults by the systems as well.

At PRESENT RESULTS TO THE USER OPERATION 226, the ranked search results are presented to the user. In one embodiment, the search results are presented to a user who ran the search, at either a computing system where data aggregation took place, where the search was initiated, or any other computing system set forth in a configuration file. Once again, a user or administrator may configure where and how results should be displayed or sent.

Referring again to FIG. 1, Activity Tracking System and Search Manager Application 106 is in computer memory 114. As used herein, a computer memory refers to a volatile memory, a non-volatile memory, or a combination of the two.

Although Activity Tracking System and Search Manager Application 106 is referred to as an application, this is illustrative only. Activity Tracking System and Search Manager Application 106 should be capable of being called from an application or the operating system. In one embodiment, an application is generally defined to be any executable code. Moreover, those of skill in the art will understand that when it is said that an application or an operation takes some action, the action is the result of executing one or more instructions by a processor.

While embodiments have been described for a client-server configuration, an embodiment may be carried out using any suitable means and/or hardware configuration involving a personal computer, a workstation, a portable device, or a network of computer devices. Other network configurations other than client-server configurations, e.g., peer-to-peer, web-based, intranet, internet network configurations, are used in other embodiments.

Herein, a computer program product comprises a nontransitory computing system readable storage medium configured to store or transport computer readable code, in accordance with an embodiment. Some examples of computing system readable storage mediums are CD-ROM discs (CDs), DVDs, ROM cards, floppy discs, magnetic tapes, computer hard drives, and servers on a network. Other examples of computing system readable storage mediums are known to those of ordinary skill.

As illustrated in FIG. 1, this medium may belong to the computing system itself. However, the medium also may be removed from the computing system. For example, computing system readable storage medium 106 may be stored in memory 136 that is physically located in a location different from CPU 108. CPU 108 is coupled to the memory 136. This may be accomplished in a client-server system, or alternatively via a connection to another computer via modems and analog lines, or digital interfaces and a digital carrier line.

More specifically, in one embodiment, computing system 102 and/or server system 130 is a portable computer, a workstation, a two-way pager, a cellular telephone, a digital wireless telephone, a personal digital assistant, a server computer, an Internet appliance, or any other device that includes components that can execute the Activity Tracking System and Search Manager functionality in accordance with at least one of the embodiments as described herein. Similarly, in another embodiment, computing system 102 and/or server system 130 each comprise multiple different computers, wireless devices, cellular telephones, digital telephones, two-way pagers, or personal digital assistants, server computers, or any desired combination of these devices that are interconnected to perform, the methods as described herein.

In view of this disclosure, Activity Tracking System and Search Manager functionality in accordance with one embodiment can be implemented in a wide variety of computing system configurations. In addition, the Activity Tracking System and Search Manager functionality could be stored as different modules in memories of different devices. For example, Activity Tracking System and Search Manager Application 106 could initially be stored in server system 130, and then as necessary, a portion of Activity Tracking System and Search Manager application 106 could be transferred to computing system 102 and executed on computing system 102. Consequently, part of the Activity Tracking System and Search Manager functionality would be executed on processor 134 of server system 130, and another part would be executed on processor 108 of computing system 102. In view of this disclosure, those of skill in the art can implement various embodiments in a wide-variety of physical hardware configurations using an operating system and computer programming language of interest to the user.

In yet another embodiment, Activity Tracking System and Search Manager application 106 is stored in memory 136 of server system 130. Activity Tracking System and Search Manager 106 is transferred over network 124 to memory 114 in computing system 102. In this embodiment, network interface 138 and I/O interface 110 would include analog modems, digital modems, or a network interface card. If modems are used, network 124 includes a communications network, and Activity Tracking System and Search Manager application 106 is downloaded via the communications network.

This disclosure provides exemplary embodiments. The scope is not limited by these exemplary embodiments, and features within each of the various embodiments may be combined with features from other embodiments. Numerous variations, whether explicitly provided for by the specification or implied by the specification or not, may be implemented by one of skill in the art in view of this disclosure.

What is claimed is:

1. A computing system implemented process comprising:
receiving indication that a user performed a user activity associated with an electronic data item;
determining the user activity that the user performed;
storing a record of the user activity in an activity log that is associated with the electronic data item;
determining if a search of user activity previously recorded in at least one activity log is desired or if there is additional user activity to record;
if a search is not desired, determining if there is additional user activity to detect and storing a record of the additional user activity in the activity log;
if a search is desired, aggregating activity logs, at a master scoring computing system from a plurality of computing systems, prior to scoring any of the user activities;
scoring the user activity by mapping the user activity to a score listed in a scoring table, wherein scoring takes place prior to receiving any search request;
storing score information in the aggregated activity logs;
receiving a search request for information relating to electronic data items, the request having search parameters and being issued by a requester, wherein the search request is received at the master scoring computing system, and wherein the search is performed at the master scoring computing system;
responsive to the search request, performing a search of the aggregated activity logs, resulting in search results matching the search parameters; and
presenting the search results to the requester.

2. The computing system implemented process of claim 1, wherein the activity log is a metadata file stored with the electronic data.

3. The computing system implemented process of claim 1 wherein the activity log is separate from the electronic data items.

4. The computing system implemented process of claim 1 wherein the requester is the user, the search parameters include scoring requirements, and the results are organized according to a cumulated score associated with each electronic data item.

5. The computing system implemented process of claim 1 further comprising:
distributing a scoring table from a master scoring computing system to the computing system, the scoring table comprising one or more score table user activities and score table scores to be associated with the one or more user activities, when the activity log is scored.

6. The computing system implemented process of claim 1 further comprising:
providing a default scoring table, the default scoring table for use when scoring the user activities, wherein the process is configured to replace the default scoring table with a newly received scoring template, responsive to receiving a new scoring table from a master scoring computing system.

7. The computing system implemented process of claim 1 further wherein the scoring table comprises a score table score and a score table user activity, the score table user activity being selected from the group consisting of:
- forwarding the electronic data item to another user, opening the electronic data item,
- clicking on a hyperlink embedded within the electronic data item,
- reading through the electronic data item, and
- scrolling through at least a portion of the electronic data item.

8. The computing system implemented process of claim 1 further comprising:
- modifying a score attributed to a user activity performed on the electronic data item based on one or more characteristics of the electronic data item.

9. The computing system implemented process of claim 8 further wherein modifying a score attributed to a user activity performed on the electronic data item comprises increasing or decreasing the score normally associated with a particular user activity based on the electronic data item having one or more characteristics selected from the group consisting of:
- the electronic data item being tagged by any user as being important,
- the electronic data item being an email having a subject that has more uppercase letters than lowercase letters,
- the electronic data item being an email that was received by more than a predetermined number of recipients.

10. A system comprising:
one or more computing processors; and
one or more memories coupled to the one or more computing processors, the one or more memories having stored therein instructions which when executed by the one or more computing processors, perform a process comprising:
- receiving indication that a user performed a user activity associated with an electronic data item;
- determining the user activity that the user performed;
- storing a record of the user activity in an activity log that is associated with the electronic data item;
- determining if a search of user activity previously recorded in at least one activity log is desired or if there is additional user activity to record;
- if a search is not desired, determining if there is additional user activity to detect and storing a record of the additional user activity in the activity log;
- if a search is desired, aggregating activity logs, at a master scoring computing system from a plurality of computing systems, prior to scoring any of the user activities;
- scoring the user activity by mapping the user activity to a score listed in a scoring table, wherein scoring takes place prior to receiving any search request;
- storing score information in the aggregated activity logs;
- receiving a search request for information relating to electronic data items, the request having search parameters and being issued by a requester, wherein the search request is received at the master scoring computing system, and wherein the search is performed at the master scoring computing system;
- responsive to the search request, performing a search of the aggregated activity logs, resulting in search results matching the search parameters; and
- presenting the search results to the requester.

11. The system of claim 10, wherein the activity log is a metadata file stored with the electronic data item.

12. The system of claim 10 wherein the activity log is separate from the electronic data item.

13. The system of claim 10 wherein the requester is the user, the search parameters include scoring requirements, and the results are organized according to a cumulated score associated with each item.

14. The system of claim 10 further comprising:
distributing a scoring table from a master scoring computing system to the computing system, the scoring table comprising one or more score table user activities and score table scores to be associated with the one or more user activities, when the activity log is scored.

15. The system of claim 10 further comprising:
providing a default scoring table, the default scoring table for use when scoring the user activities, wherein the process is configured to replace the default scoring table with a newly received scoring template, responsive to receiving a new scoring table from a master scoring computing system.

16. The system of claim 10 further comprising:
modifying a score attributed to a user activity performed on the electronic data item based on one or more characteristics of the electronic data item.

17. The system of claim 16 further wherein modifying a score attributed to a user activity performed on the electronic data item comprises increasing or decreasing the score normally associated with a particular user activity based on the electronic data item having one or more characteristics selected from the group consisting of:
- the electronic data item being tagged by any user as being important, the electronic data item being an email having a subject that has more uppercase letters than lowercase letters,
- the electronic data item being an email that was received by more than a predetermined number of recipients.

18. A computing program product comprising:
a non-transitory computing system readable storage medium, the computing system readable storage medium having instructions stored thereon which when executed by one or more computing processors, perform a process comprising:
- receiving an indication that a user performed a user activity associated with an electronic data item;
- determining the user activity that the user performed;
- storing a record of the user activity in an activity log that is associated with the electronic data item;
- if a search is not desired, determining if there is additional user activity to detect and storing a record of the additional user activity in the activity log;
- determining if a search of user activity previously recorded in at least one activity log is desired or if there is additional user activity to record;
- if a search is desired, aggregating activity logs, at a master scoring computing system from a plurality of computing systems, prior to scoring any of the user activities;
- scoring the user activity by mapping the user activity to a score listed in a scoring table, wherein scoring takes place prior to receiving any search request;
- storing score information in the aggregated activity logs;
- receiving a search request for information relating to electronic data items, the request having search parameters and being issued by a requester, wherein the search request is received at the master scoring computing system, and wherein the search is performed at the master scoring computing system;
responsive to the search request, performing a search of the aggregated activity logs, resulting in search results matching the search parameters; and
presenting the search results to the requester.

* * * * *